K. SCHWARZ.
TWO STROKE CYCLE COMBUSTION ENGINE.
APPLICATION FILED JAN. 21, 1911.

1,028,615.

Patented June 4, 1912.

Witnesses:

Inventor:
Karl Schwarz

UNITED STATES PATENT OFFICE.

KARL SCHWARZ, OF NUREMBERG, GERMANY.

TWO-STROKE CYCLE COMBUSTION-ENGINE.

1,028,615.
Specification of Letters Patent.
Patented June 4, 1912.

Application filed January 21, 1911. Serial No. 603,822.

*To all whom it may concern:*

Be it known that I, KARL SCHWARZ, a citizen of the Empire of Germany, residing at Nuremberg, in the Empire of Germany, have invented a new and useful Two-Stroke Cycle Combustion-Engine, of which the following is a specification.

Experience has shown, that large two-stroke cycle combustion engines give better results, if several combustion chambers independent of one another are disposed in the cylinder, which combustion chambers are preferably made long and narrow. In order to keep the total length of the cylinder over all within reasonable limits, it is absolutely necessary to so dispose these combustion chambers in radial planes as to each reach from the inside wall to a point without the inner periphery of the cylinder. Thereby, however, new difficulties are created in the construction of the cylinder, since the space at disposal for the valves leading to the combustion chambers and for the parts operating the said valves is too limited. It would not be permissible to cut into the cylinder flanges for obtaining the said space without loosing the necessary tightness of the cylinder under high pressures.

My invention relates to improvements in cylinders for large two-stroke cycle combustion engines, whereby the said difficulties are avoided.

One improvement consists in tapering one or both ends of the jacketed cylinder and to shift the flange for connecting the cylinder with the cover to a point between the end and the middle of the cylinder.

Another improvement consists in providing one or each cover with a conical extension adapted to compass the tapering cylinder end and to come with its flange in contact with the flange of the cylinder.

I will now proceed to describe my invention with reference to the accompanying drawing, in which—

Figure 1:
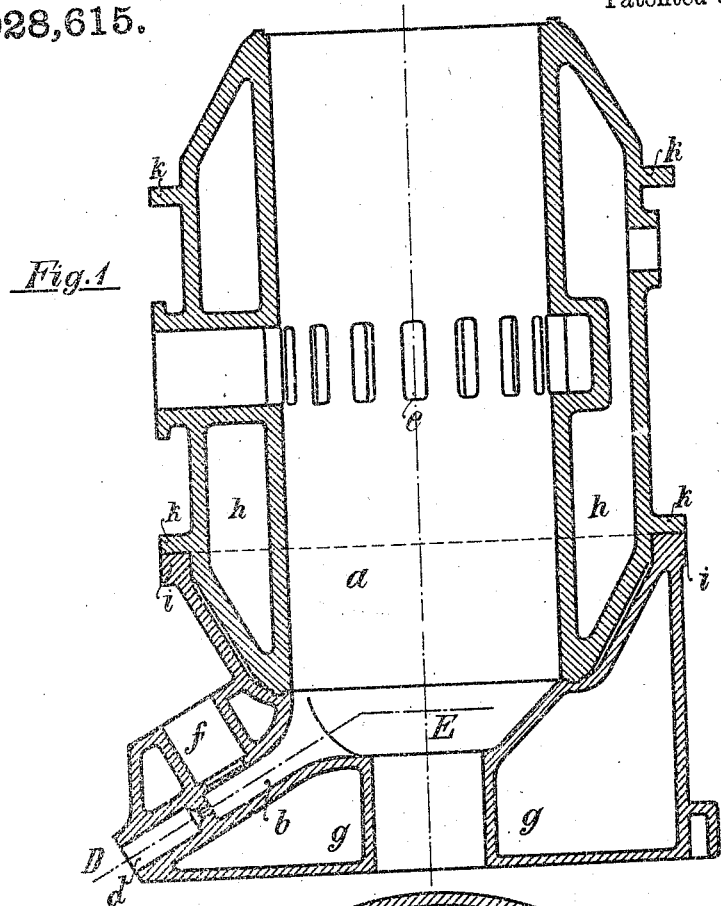
Figure 2:
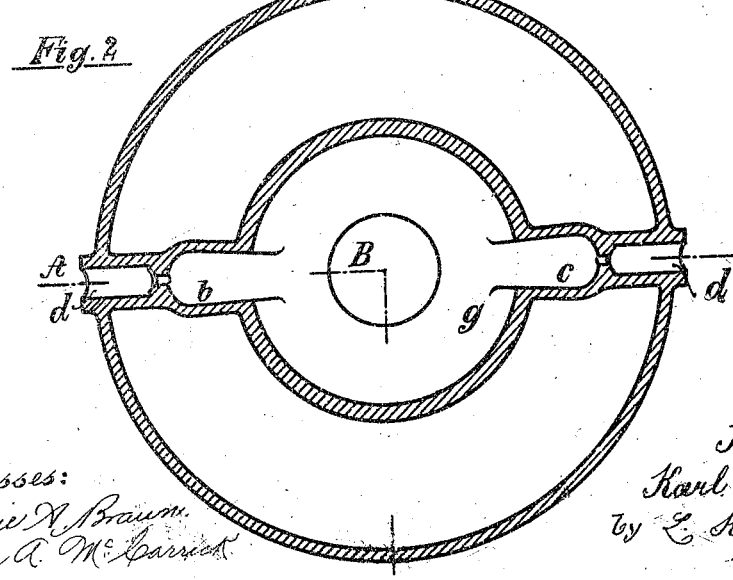

Figure 1 is a vertical longitudinal section of a vertical cylinder and the lower cover on line A, B, C of Fig. 2, the right half of both parts being shown as turned 90° to the left. Fig. 2 is a cross section through the lower cover on the line D—E in Fig. 1, the line A, B¹ being extended through the right hand portion of the device to indicate the corresponding parts as shown on the left side.

Similar letters of reference refer to similar parts in both views.

In Fig. 1 only the lower half of the vertical cylinder $a$ is shown, because the upper half may be constructed in any other known manner. As is clearly shown, the cylinder $a$ provided with a jacket $h$ for the cooling medium and with the usual outlet slots $e$ has its lower end tapered on the outside and a flange $k$ at a convenient height above the lower end face. Consequently the lower cover $g$ is upwardly extended so as to compass the tapered cylinder end and to come with its flange $i$ in contact with the cylinder flange $k$. The cover $g$ is here provided with two opposite combustion chambers $b$ and $c$ in the same vertical central plane, the chambers being inclined and reaching from the conical inside wall of the cover to a point without the inner periphery of the cylinder. The cover $g$ is provided with a tubular connection $f$ above each combustion chamber $b$ and with a tubular connection $d$ in the axis of this chamber. The tubular connection $f$ is for the air-inlet valve and it will be clear after an examination of Fig. 1, that it is possible to spare in the cover $g$ sufficient space for the cover of the air-inlet valve chamber and for the parts operating this valve without making any recess in the two flanges $i$ and $k$ whereby the tightness of the cylinder under high pressures might be destroyed. The tubular connection $d$ is of course for the injecting device.

The construction described of the cylinder is particularly suitable for large vertical two-stroke cycle combustion engines and presents the advantage, that the stability of the engine is thereby considerably increased. Of course the construction described can also be applied to horizontal and other engines. In this case both ends of the cylinder and both covers may be of a similar construction.

I claim:

1. In a two-stroke cycle combustion engine, the combination with a jacketed cylinder having one end tapered on the outside and a flange at a point between its central portion and the end face, of a cover with a flange adapted to compass the tapered cylinder end and to come with its flange in contact with the cylinder flange, said cover having several long and narrow combustion chambers in radial planes extending from the inside wall to a point without the inner periphery of said cylinder whereby it is rendered possible to spare spaces in the cover for the air-inlet valves and the parts operating same without cutting into the two flanges.

2. In a two-stroke cycle combustion engine, the combination with a jacketed cylinder having its two ends tapered on the outside and two flanges between its central portion and the end faces, of two covers with flanges adapted to compass the tapered cylinder ends and to come with their flanges in contact with the cylinder flanges, said two covers having each several long and narrow combustion chambers in radial planes extending from the inside wall to a point without the inner periphery of said cylinder whereby it is rendered possible to spare spaces in the covers for the air-inlet valves and the parts operating same without cutting into the flanges.

3. In a two-stroke cycle combustion engine, the combination with a jacketed cylinder having one end tapered on the outside and a flange at a point between its central portion and the end face, of a cover with a flange adapted to compass the tapered cylinder end and to come with its flange in contact with the cylinder flange, said cover having several long and narrow combustion chambers in radial planes, which chambers are inclined to the cylinder axis and extend from the inside wall to a point without the inner periphery of said cylinder, said cover having also tubular connections for the injecting devices in line with and tubular connections for the air-inlet valves at right angles to the combustion chambers, whereby space is obtained for the parts operating the air-inlet valves without cutting into the two flanges.

4. In a two-stroke cycle combustion engine, the combination with a jacketed cylinder having its two ends tapered on the outside and two flanges between its central portion and the end faces, of two covers with flanges adapted to compass the tapered cylinder ends and to come with their flanges in contact with the cylinder flanges, said two covers having each several long and narrow combustion chambers in radial planes which chambers are inclined to the cylinder axis and extend from the inside wall to a point without the inner periphery of said cylinder, said cover having also tubular connections for the injecting devices in line with and tubular connections for the air-inlet valves at right angles to the combustion chambers, whereby space is obtained for the parts operating the air-inlet valves without cutting into the flanges.

KARL SCHWARZ.

Witnesses:
 UEBLEN,
 ELIZABETH HELLMUTH.